May 28, 1968     T. J. HOLTERMANN ET AL     3,385,052
EXHAUST SYSTEM
Filed Dec. 1, 1965
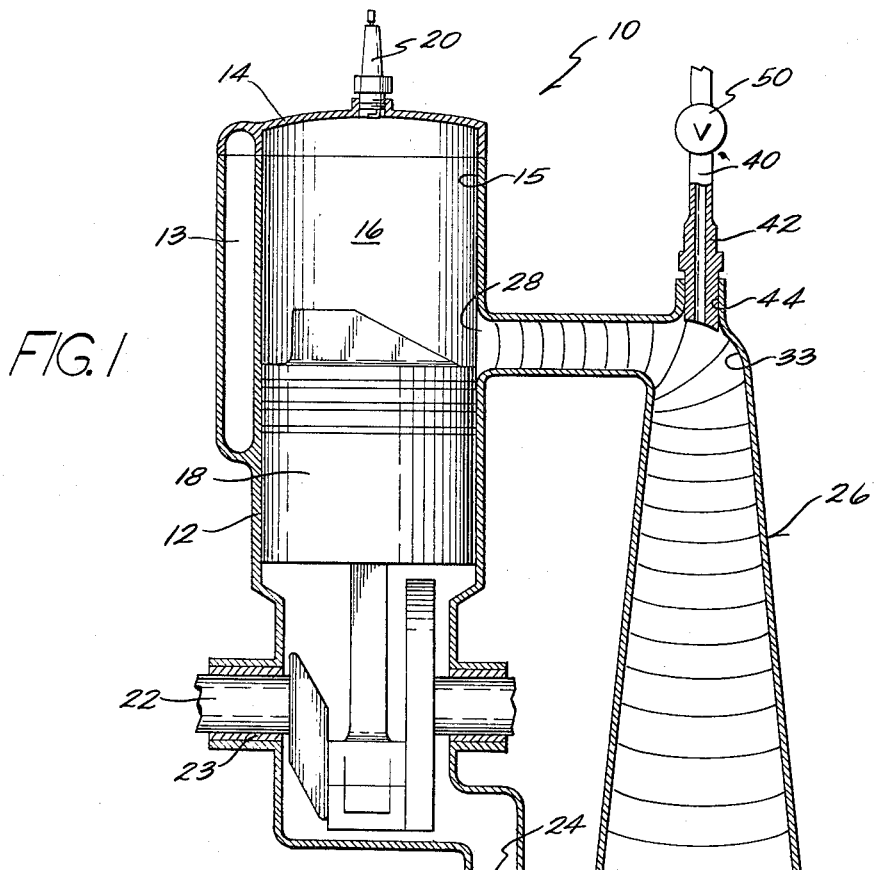
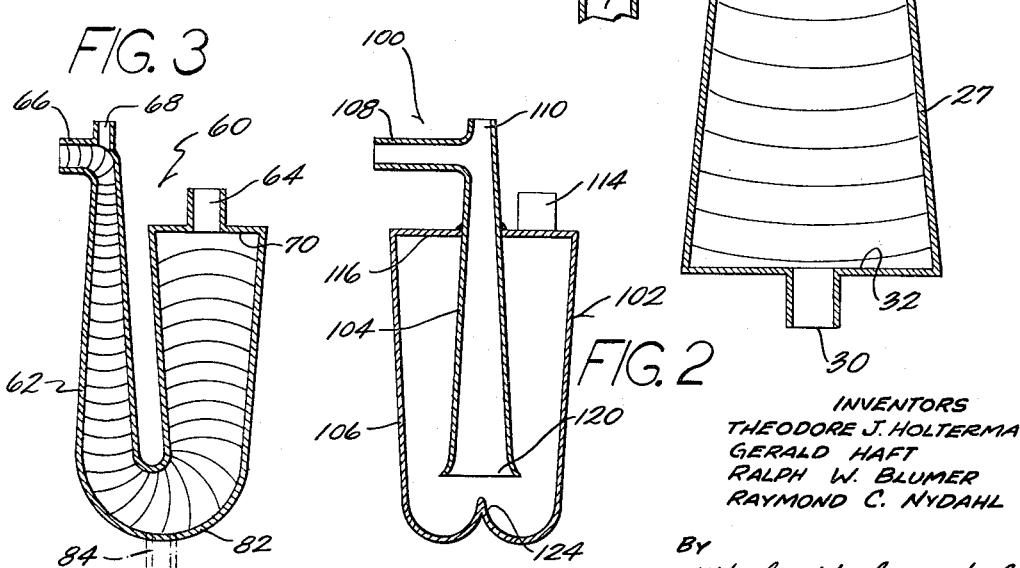
INVENTORS
THEODORE J. HOLTERMANN
GERALD HAFT
RALPH W. BLUMER
RAYMOND C. NYDAHL
BY
Wheeler, Wheeler & Wheeler
ATTORNEYS United States Patent Office 3,385,052
Patented May 28, 1968

3,385,052
EXHAUST SYSTEM
Theodore J. Holtermann, Milwaukee, Gerald Haft, Brookfield, and Ralph W. Blumer and Raymond C. Nydahl, Menomonee Falls, Wis., assignors to Outboard Marine Corporation, Waukegan, Ill., a corporation of Delaware
Filed Dec. 1, 1965, Ser. No. 510,784
15 Claims. (Cl. 60—30)

ABSTRACT OF THE DISCLOSURE

Disclosed herein is a method of operating an internal combustion engine comprising the steps of discharging burned gases from a combustion chamber through an exhaust port to an exhaust passage to obtain timed return of a pressure wave to the exhaust port by injecting a liquid into the burned gases discharged from the combustion chamber. Also disclosed herein is an internal combustion engine having means for timing the return to an exhaust port of a pressure wave in an exhaust passageway, including means for supplying cooling liquid to the passageway. As disclosed herein an internal combustion engine includes an exhaust passageway increasing in internal cross-sectional area in the direction away from an exhaust port and terminating in a wall transverse to said direction. Said passageway also includes therein means defining an opening which is located adjacent to the wall and which has a relatively small area as compared to the area of the wall.

---

This invention relates to methods of operating an internal combustion engine and to exhaust arrangements for internal combustion engines.

An object of the invention is to provide a method of operating a two-stroke internal combustion engine wherein the compressive pressure waves or pulses which are set up in the exhaust system by the discharge of exhaust gases are returned to the exhaust port, as compressive pressure waves, to thereby utilize the pressure waves to increase the efficiency and ultimately the horsepower of the engine.

Another object of the invention is to provide a method of operating a two-stroke internal combustion engine wherein the time of return of any returning pressure wave, i.e. either a positive or compressive wave or a negative or rarefactive wave, is controlled so that the returning pressure wave arrives at the exhaust port at an optimum time affording full utilization of the energy of the pressure wave to increase the efficiency and ultimately the horsepower of the engine.

Another object of the invention is to provide a method of operating a two-stroke internal combustion engine wherein the time of return of any returning pressure wave is selectively controlled over a range of engine speeds so that the returning pressure wave arrives at the exhaust port at an optimum time for any engine speed in said range of engine speeds thereby affording full utilization of the pressure wave to increase the efficiency and ultimately the horsepower of the engine.

Another object of the invention is to provide an internal combustion engine having an exhaust arrangement which is effective to afford return of compressive pressure waves or pulses in the exhaust system toward the exhaust port, as compressive pressure waves or pulses, to thereby increase the efficiency and ultimately the horsepower of the engine.

Another object of the invention is to provide an internal combustion engine having an exhaust arrangement which is effective to control the time of arrival of any pressure wave at the exhaust port.

Another object of the invention is to provide an internal combustion engine having an exhaust arrangement which is effective to afford selective control of the time of arrival of any returning pressure wave at the exhaust port over a range of engine speeds.

A sharp, positive or compressive pressure wave or pulse is released or initiated in the exhaust system when the exhaust port of a two-stroke engine opens. This pulse travels along the exhaust passage at the local acoustic velocity. In accordance with the invention, the compressive pressure wave or pulse is returned to the exhaust port as a positive or compressive wave to thereby utilize the energy of the pulse to improve the performance of the engine.

More specifically, the compressive or positive pressure waves or pulse is returned to the exhaust port just prior to closing thereof, in which case, the positive pressure wave can raise the pressure of the gas in the engine cylinder and thus effect a slight super charge, and/or effectively stop the flow of fresh charge from the exhaust port and thus reduce short circuiting and loss of fuel. In practice, both effects are believed to be realized with the ultimate benefit of increased power and decreased fuel consumption.

The method of operating an internal combustion engine as contemplated by this invention comprises the steps of discharging the burned gases from the combustion chamber through an exhaust port and to an exhaust passage communicating with the exhaust port to obtain a returning pressure wave. The method of the invention also includes the step of controlling the time of return, over a range of engine speeds, of any returning pressure wave so that the returning pressure wave arrives at the exhaust port for any engine speed within said range at an optimum time when the wave will be effective to increase the efficiency and ultimately the horsepower of the engine.

An engine operable in accordance with the method described above generally includes a combustion chamber, an exhaust port communicating with the combustion chamber, and an exhaust passage communicating with the exhaust port, together with means for affording return of the compressive pressure waves in the exhaust system, and means for controlling, over a range of engine speeds, the time of return of any returning pressure wave in timed relation to closing of the exhaust port.

Other objects, advantages, and features will become apparent from the following description and accompanying drawings in which:

FIGURE 1 is a partially schematic, cross sectional view of an internal combustion engine incorporating various of the features of the invention;

FIGURE 2 is a cross sectional view of a modified form of an exhaust passage incorporated in the engine shown in FIGURE 1; and FIGURE 3 is a view similar to FIGURE 2, showing another modified form of an exhaust passage incorporated in the engine shown in FIGURE 1.

Referring now to the drawings and, more particularly, to FIGURE 1, the engine 10 is typically a two-stroke engine having one or more cylinders. For purposes of illustration, a single cylinder is shown. The engine 10 generally comprises an engine block 12 carrying a cylinder head 14. The block 12 and cylinder head 14 have formed therein a water jacket 13 to afford cooling of the engine 10. The engine block 12 is provided with a bore 15 defining a combustion chamber 16 located between the cylinder head 14 and a piston 18 movable in the bore 15. Extending into the combustion chamber 16 is a spark plug 20. The piston 18 is suitably connected to a crankshaft 22 carried in suitable bearings 23 in the engine block 12.

The combustion charge is admitted to the combustion chamber 16 in a conventional manner. For example, the intake 24 is connected to a carburetor (not shown) to afford admission of the combustion charge from the intake through the crankcase and through a transfer passage (not shown) to the combustion chamber. After ignition of the combustion charge by the spark plug 20, the burned gases are discharged to an exhaust passage or passageway 26 which preferably includes a diverging horn portion 27 having any suitable cross sectional configuration and which communicates with the combustion chamber 16 through an exhaust port 28 disposed in the wall of the engine block 12. The exhaust port 28 is closed by the piston 18 during compression of a fresh combustion charge.

The method contemplated by the invention of operating the internal combustion engine 10 comprises the steps of discharging burned gases from the combustion chamber 16 through the exhaust port 28 into the exhaust passageway 26 communicating with the exhaust port 28. Such discharge of the combustion gases through the exhaust passageway 26 results in one or more positive or compressive pressure waves which normally travel along the exhaust passageway 26 at the local speed of sound and which can be referred to as acoustical pressure waves. In accordance with the method of the invention, the pressure waves are then returned to the exhaust port 28, as positive pressure waves. The word "return" is used herein to mean that the direction of travel of the pressure waves is reversed so that the waves return to their place of emission or origin—namely, the exhaust port area. "Returning" the pressure waves toward the exhaust port is distinguished from "directing" the pressure waves toward the exhaust port in that the latter contemplates a pressure wave that is already returning or a returning pressure wave. In the illustrated embodiment, the method also includes controlling the time of return of any returning pressure waves (either positive or compressive pressure waves as previously discussed, or negative or rarefactive pressure waves, which can be utilized to improve scavenging of the exhaust gases from the engine) to afford arrival thereof at the exhaust port 28 prior to closing of the exhaust port 28 by the piston 18, notwithstanding variation in engine speed. The step of timing or controlling the time of return of any returning pressure wave includes affecting the temperature of the gases in the exhaust passageway by injection of a cooling liquid into said gases. The cooling liquid lowers the temperature of the exhaust gases to thereby slow or retard the rate of travel, in the exhaust passageway, of any pressure wave. The method also includes the step of varying the volume of liquid injected into the gases in accordance with engine speed so that any returning pressure wave will arrive at the exhaust port at an optimum time over a wide range of engine speeds.

An engine constructed to afford operation in accordance with the method described above comprises in addition to the components previously described, means in the exhaust passageway 26 for affording return toward the exhaust port 28 of the compressive pressure waves traveling in the exhaust passageway 26. Said means can comprise a restriction or a returning surface disposed in the exhaust passageway 26. An exhaust system utilizing such a restriction or such a returning surface is referred to as a closed end exhaust system and affords return toward the exhaust port of a positive or compressive, pressure wave or pulse as distinguished from an open end exhaust system which can afford return of a negative or rarefactive pressure wave. In the illustrated embodiment, the exhaust passageway 26 has an outlet 30 which is greatly reduced in size in comparison to the remainder of the exhaust passageway 26 to provide the aforementioned restriction, together with a returning surface 32 disposed in the exhaust passageway 26 in surrounding relation to the outlet 30. Accordingly, compressive pressure waves are returned toward the exhaust port 28 by the returning surface 32. To afford directing, toward the returning surface 32, of the pressure waves which are traveling from the exhaust port 28 (hereinafter referred to as exiting pressure waves) and to afford directing, toward the exhaust port 28, of the pressure waves which are traveling toward the exhaust port 28 after being returned by the returning surface 32 (hereinafter referred to as returning pressure waves), the exhaust passageway 26 includes therein a reflecting or guiding surface 33.

The outlet opening 30 defining the restriction can be disposed any place in the exhaust passageway and, if desired, can be displaced from the returning surface, as will hereinafter be described. The horn portion 27 is preferably constructed so that the transverse cross section thereof substantially continuously increases as the distance from the exhaust port increases. Such a diverging horn portion construction is believed to beneficially affect the operation of the engine so as to further increase the efficiency and horsepower thereof.

An engine constructed to afford operation in accordance with the method described above also includes means, preferably operable over a range of engine speeds, for timing or controlling the time of return of any returning pressure waves toward the exhaust port 28 to afford arrival of the pressure waves at the exhaust port 28 in timed relation to closing of the exhaust port 28 by the piston 18. Such timing or control can be accomplished in various ways. For instance, such control can be obtained by dimensioning the length of the exhaust passage 26 so that the returning pressure waves will arrive at the exhaust port 28 prior to closing of the exhaust port 28. However, the length of the exhaust passageway will generally be suitable for only one engine speed or for only a small range of speeds around said one engine speed. It is therefore desirable to provide an arrangement affording arrival of the returning pressure waves at the exhaust port in proper time relation to exhaust port closing over a wider range of engine speeds. Various arrangements can be employed. For instance, the exhaust passageway 26 can include means mechanically affording variation in exhaust passageway length in proportion to the speed of the engine.

The means for controlling the time of arrival of any pressure waves can also comprise means for controlling the rate of travel of the pressure waves. Such means can include a conduit 40 connected at one end to a supply of water (not shown) and, at its other end, to the exhaust passageway 26 by a suitable fitting 42 which is inserted into a suitable bore 44 in the exhaust passageway 26 and which is preferably in the form of a nozzle to afford sprayed discharge of the water into the passageway. This arrangement is effective to inject water directly into the discharged burned gases to thereby lower their temperature, whereby to slow or retard the rate of travel of the pressure waves in the exhaust passage.

Though not limited thereto, this invention contemplates an engine having an exhaust passageway tuned, as heretofore described, for high engine speeds. Therefore, the volume of water injected into the exhaust passageway 26 is inversely proportional to the engine speed. Specifically, a larger amount of water is injected at a lower engine speed and a smaller volume of water is injected at a higher engine speed to respectively afford greater and lesser exhaust gas cooling. Any suitable source of water and means for controlling the rate of flow of the water can be employed. For example, the conduit 40 can be connected to the water pump (not shown) of the engine 10, and any valve 50 for controlling the rate of flow can be employed.

If desired, the control of the time of arrival can be effected by cooling the exhaust gases by means of an external water jacket around the horn portion 27. The rate of flow in the jacket can be varied to effect different cooling rates.

The use of a cooling fluid to control the time of arrival of the pressure wave at the exhaust port is advantageous regardless of the manner in which the returning pressure is generated and regardless of whether the returning pressure wave is a positive or compressive wave which tends to increase the pressure in the combustion chamber, or a negative or rarefactive wave which tends to improve scavenging of the burned gases from the combustion chamber of the engine. Thus, the cooling feature of this invention is applicable to an exhaust arrangement which affords return of a positive wave, a negative wave, and combinations of both positive and negative waves.

To afford a more compact installation, the horn portion of the exhaust passageway can be folded or bent into any configuration. Two exemplary embodiments are illustrated in FIGURES 2 and 3. Referring to FIGURE 2, the exhaust passageway 60 includes a horn portion 62 which diverges toward an outlet opening 64, and which folds or bends upon itself at bend 82. The horn portion 62 can have any suitable cross sectional configuration. The end 66 of the exhaust passageway 60 communicates with an exhaust port, such as the exhaust port 28 shown in FIGURE 1, and the opening 68 receives a water injection nozzle, such as the water injection nozzle 42, shown in FIGURE 1. The outlet opening 64 is of reduced diameter and is surrounded by a returning surface 70. The bend 82 defines a reflecting surface which affords direction of the existing pressure waves toward the returning surface 70, and also affords direction of the returning pressure waves toward the exhaust port.

As previously mentioned, the outlet opening can be located any place in the exhaust passageway. For example, referring to FIGURE 3, the outlet opening 84 can be located at the bend 82 (as shown in phantom lines in FIGURE 3) in which case the remote end of the exhaust passageway 60 would be completely closed and would serve entirely as a returning surface.

The exhaust passage can also be compactly arranged as illustrated in FIGURE 2 wherein the exhaust passageway 100 includes a diverging horn portion 102 comprising a first section or part 104 received within a second larger section or part 106. The horn portion 102 can be of any suitable cross sectional configuration. The first section 104 includes an end 108 adapted to communicate with an exhaust port, such as the exhaust port 28 shown in FIGURE 1, and includes an opening 110 adapted to receive an injection nozzle, such as injection nozzle 42 shown in FIGURE 1.

The second section 106 includes an outlet opening 114 and a corresponding returning surface 116. To afford support of the first portion 104 within the second portion 106, the first section 104 passes through a suitable bore in the returning surface 116 and is fixed to the returning surface 116. The outlet 120 of the first section 104 is proximate a reflecting surface 124 which affords direction of the exiting pressure waves toward the returning surface 116 and affords direction of the returning pressure waves into the outlet opening 120 of the first section 104 and toward the exhaust port.

The exhaust arrangement of this invention can be used on any symmetrically ported two-stroke engine, and it can be used on individual cylinders or in pairs. This type of exhaust arrangement is especially adaptable to outboard engines because it is comparatively unaffected by outlet conditions and is therefore amenable to underwater exhaust.

Various of the features of this invention are set forth in the following claims:

What is claimed is:

1. A method of operating an internal combustion engine provided with a combustion chamber communicating with an exhaust passage through an exhaust port which is closed by movement of a piston, said method comprising the steps of discharging the burned gases from the combustion chamber to the exhaust passage for obtaining a returning pressure wave, and timing the return of the pressure wave to the exhaust port, said step of timing the return of the pressure wave including the step of varying the temperature of the burned gases in the exhaust passageway.

2. A method of operating an internal combustion engine provided with a combustion chamber communicating with an exhaust passage through an exhaust port which is closed by movement of a piston, said method comprising the steps of discharging the burned gases from the combustion chamber to the exhaust passage for obtaining a returning pressure wave, and timing the return of the pressure wave to the exhaust port, said step of timing the return of the pressure wave including the step of injecting a liquid into the burned gases discharged from the combustion chamber.

3. A method in accordance with claim 2 including the step of varying the volume of the liquid injected in the burned gases in accordance with the speed of the engine.

4. A method of operating an internal combustion engine provided with a combustion chamber communicating with an exhaust passage through an exhaust port which is closed by movement of a piston, said method comprising the steps of discharging the burned gases from the combustion chamber to the exhaust passage, returning to the exhaust port a compressive pressure wave which results from discharge of the burned gases, and timing the return of said compressive pressure wave to said exhaust port in relation to the closing of said exhaust port by the piston, said step of timing the return of the compressive pressure wave being afforded by injecting a liquid into the burned gases discharged from the combustion chamber to afford cooling of said burned gases.

5. A method of operating an internal combustion engine in accordance with claim 4 wherein the liquid is water.

6. A method of operating an internal combustion engine in accordance with claim 4 including the step of varying the volume of the liquid injected into the burned gases in accordance with the speed of the engine.

7. An internal combustion engine comprising an engine block, a piston reciprocably movably carried in said block, a cylinder head carried on said block and defining in conjunction with said piston a combustion chamber, an exhaust port communicating with said combustion chamber and being disposed to be closed by said piston, an exhaust passageway communicating with said exhaust port, means in said exhaust passageway for returning to said exhaust port, as compressive pressure waves, the compressive pressure waves traveling in said exhaust passageway, and means for timing the return of the compressive pressure waves in relation to the closing of said exhaust port to afford arrival of said compressive pressure waves at said exhaust port prior to the closing of said exhaust port by said piston, said means for timing the return of said compressive pressure waves including means for supplying cooling liquid to said passageway including a conduit communicating with said exhaust passageway and with a source of cooling liquid.

8. An internal combustion engine in accordance with claim 7 including means for controlling the rate of flow of said liquid in said conduit.

9. A method of operating an internal combustion engine provided with a combustion chamber communicating with an exhaust passage through an exhaust port, said method comprising the steps of discharging the burned gases from the combustion chamber to the exhaust passage to obtain a return pressure wave and timing the return of the pressure wave to the exhaust port by varying the temperature of the burned gases in the exhaust passageway.

10. A method of operating an internal combustion engine provided with a combustion chamber communicating with an exhaust passage through an exhaust port, said method comprising the steps of discharging the burned gases from the combustion chamber to the exhaust passage to obtain a return pressure wave and timing the return of the pressure wave to the exhaust port by injecting a liquid into the burned gases discharged from the combustion chamber.

11. A method of operating an internal combustion engine provided with a combustion chamber communicating with an exhaust passage through an exhaust port, said method comprising the steps of discharging the burned gases from the combustion chamber to the exhaust passage, returning to the exhaust port the compressive pressure wave which results from discharge of the burned gases, and timing the return of said compressive pressure wave to said exhaust port in relation to the closing of said exhaust port by injecting a liquid into the burned gas discharged from the combustion chamber to afford cooling of said burned gases.

12. An internal combustion engine comprising an engine block, a piston reciprocably movably carried in said block, a cylinder head carried by said block and defining in conjunction with said piston a combustion chamber, an exhaust port communicating with said combustion chamber, an exhaust passageway communicating with said exhaust port, means in said exhaust passageway for returning toward said exhaust port, as a pressure wave, the pressure wave traveling in said exhaust passageway, and means for timing the return of the pressure wave toward the exhaust port in relation to the closing of the exhaust port to afford arrival of said pressure wave at said exhaust port prior to the closing of said exhaust port, said means for timing the return of said pressure wave including means for supplying cooling liquid to said passageway including a conduit communicating with said exhaust passageway and with a source of cooling liquid.

13. An internal combustion engine comprising an engine block, a piston reciprocably movably carried in said block, a cylinder head carried on said block and defining in conjunction with said piston a combustion chamber, an exhaust port communicating with said combustion chamber, and an exhaust passageway communicating with said exhaust port, said passageway substantially continuously increasing in internal cross sectional area in the direction away from said port and terminating in a wall transverse to said direction, said passageway also having therein means defining an opening located adjacent to said wall and having a relatively small area as compared to the area of said wall.

14. An internal combustion engine comprising an engine block, a piston reciprocably movably carried in said block, a cylinder head carried on said block and defining in conjunction with said piston a combustion chamber, an exhaust port communicating with said combustion chamber, an exhaust passageway communicating with said exhaust port, said passageway substantially continuously increasing in internal cross sectional area in the direction away from said port and terminating in a wall transverse to said direction, said passageway also having therein means defining an opening located adjacent to said wall and having a relatively small area as compared to the area of said wall, whereby pressure waves traveling in said exhaust passageway impinge against said wall and are returned toward said exhaust port, and means for timing the return of the pressure waves toward said exhaust port in relation to the closing of said exhaust port to afford arrival of said pressure waves at said exhaust port prior to the closing of said exhaust port.

15. An internal combustion engine in accordance with claim 14 wherein said means for timing the return of said pressure waves includes means for supplying cooling liquid to said passageway including a conduit communicating with said exhaust passageway and with a source of cooling liquid.

References Cited

UNITED STATES PATENTS

| | | | |
|---|---|---|---|
| 1,589,391 | 6/1926 | Herr | 60—32 |
| 1,713,047 | 5/1929 | Maxim | 60—32 |
| 1,860,569 | 5/1932 | Bourne | 60—32 |
| 2,102,559 | 12/1937 | Kadenacy | 60—32 |
| 2,542,756 | 2/1951 | Draminsky | 123—65 |
| 2,919,542 | 1/1960 | Servanty | 60—39.77 X |
| 3,254,484 | 6/1966 | Kopper | 123—65 X |

RALPH D. BLAKESLEE, *Primary Examiner.*